Aug. 21, 1923.
W. C. ERICKSON ET AL
1,465,467
WHEEL PULLER
Filed Nov. 29, 1921
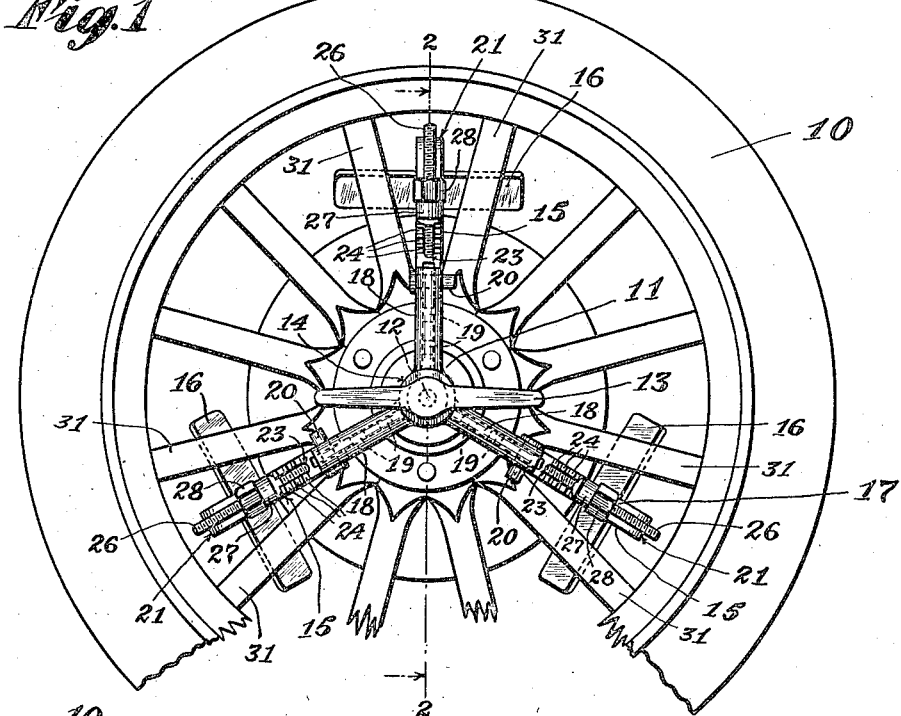
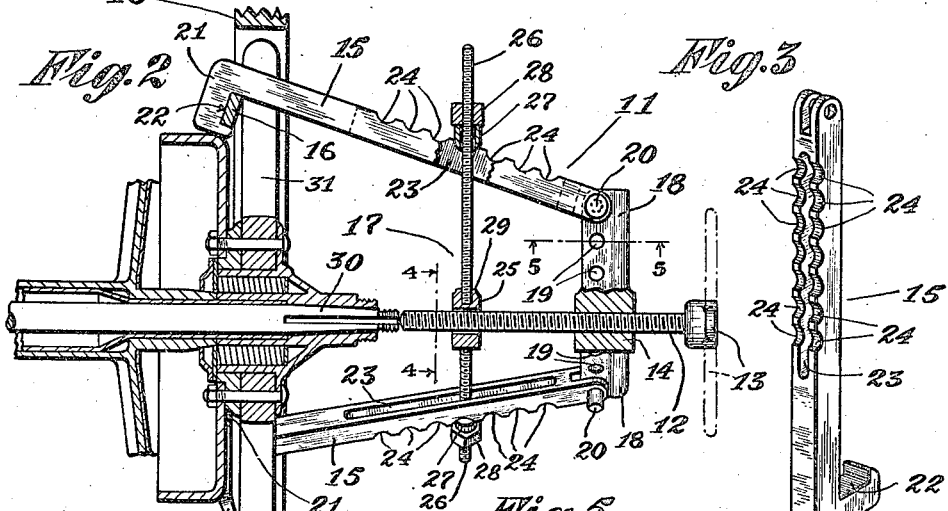
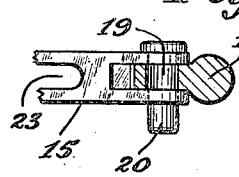
Inventors.
Wallace C. Erickson.
Horace L. Conrad.
Attorney
Frank Warren Patented Aug. 21, 1923.

1,465,467

UNITED STATES PATENT OFFICE.

WALLACE C. ERICKSON AND HORACE L. CONRAD, OF SEATTLE, WASHINGTON.

WHEEL PULLER.

Application filed November 29, 1921. Serial No. 518,506.

*To all whom it may concern:*

Be it known that we, WALLACE C. ERICKSON and HORACE L. CONRAD, citizens of the United States, residing at Seattle, in the county of King and State of Washington, have invented a certain new and useful Improvement in Wheel Pullers, of which the following is a specification.

Our invention relates to improvements in wheel pullers and more particularly to the type of wheel pullers adapted for removing rear wheels of automotive vehicles or for removing gears or the like from their associated shafts or spindles and the object of our invention is to provide a wheel puller embodying novel axially and radially adjustable anti-spreading mechanism whereby the gripping arms of said puller are retained in a predetermined or fixed position against outward movement.

Another object is to provide a wheel puller having means upon the outer ends of the gripping arms thereof whereby the associated spoke engaging plates are seated and retained in operative position upon the wheel to be removed during the removing operation.

With the above and other more specific objects in view which will appear as the description proceeds, our invention resides in the novel construction, combination, adaptation and arrangement of parts hereinafter described and claimed.

We accomplish these objects by devices illustrated in the accompanying drawings, wherein—

Figure 1 is a view in end elevation of a wheel puller embodying the features of our invention and as it would appear when operatively disposed upon the rear wheel of an automotive vehicle;

Fig. 2 is a view in vertical longitudinal section of the same, taken on a broken line 2, 2 of Fig. 1, parts being in elevation;

Fig. 3 is a perspective view of the gripping arms of our wheel as it would appear when detached from the same;

Fig. 4 is a view in transverse section, taken on a broken line 4, 4 of Fig. 2; and Fig. 5 is a similar view, taken on a broken line 5, 5 of Fig. 2.

Referring to the drawings throughout which like reference numerals designate like parts, the numeral 10 designates a rear wheel of an automotive vehicle and 11 a wheel puller embodying our invention and illustrated as operatively disposed upon said wheel.

The wheel puller 11 comprises a spindle 12, an actuating handle 13, a travelling nut or crosshead 14, gripping arms 15, spoke engaging plates 16 and axially and radially adjustable anti-spreading mechanism 17 for the gripping arms 15.

The spindle 12 is screw threaded throughout the length thereof substantially as shown, and is adapted to receive upon the outer end thereof the actuating handle 13, which handle is adapted to be fixedly secured in perpendicular relation thereon in any well known manner.

The travelling nut 14 is adapted to be threadably engaged for axial adjustment upon the spindle 12, and is provided with a plurality of integral outwardly projecting radial arms 18, which arms are formed substantially in the shape and manner shown in Figs. 1, 2 and 5, each of said arms being provided with a plurality of spaced or equidistant holes or apertures 19 adjacent the inner edges thereof and in aligned parallel relation thereto.

The gripping arms 15 are formed substantially in the shape and manner shown in Fig. 3 and are adapted to be pivotally connected at the inner or bifurcated ends thereof, as by pivot pins 20, to the radial arms 18 of the travelling nut 14.

Integrally formed upon the outer ends of the gripping arms 15 are claw members 21, which claw members are provided on their inner faces thereof with recesses 22, which recesses are adapted to normally receive the spoke engaging plates 16 during the operation of removing a wheel or the like, as more clearly shown in Fig. 2, to thus prevent the dislodgment of said plates during the said operation.

Formed within the inner end portions of the gripping arms 15 are longitudinally and medially disposed slots 23, which slots are also disposed in aligned relation with respect to the bifurcated inner ends of said gripping arms.

Formed within the outer edges of the walls of the longitudinal slots 23 of the gripping arms 15 are a plurality of arcuate notches or serrations 24, substantially as disclosed in Fig. 3.

The axially and radially adjustable antispreading mechanism 17 for the gripping arms 15 comprises a collar 25, radially disposed threaded stems 26, spacing sleeves or washers 27 and adjusting nuts 28.

The collar 25 is adapted to be concentrically disposed upon the spindle 12 for free axial movement thereon, as shown in Fig. 2.

The radially disposed threaded stems 26 are adapted to be threadably engaged at their inner ends within radial bosses 29 integrally formed upon the periphery of the collar 25, and to extend outwardly therefrom in radial relation thereto through the longitudinal slots 23 of their associated gripping arms 15, as more clearly shown in Fig. 2.

The spacing sleeves or washers 27 are adapted to be concentrically disposed for free axial movement upon their associated stems 26, and are provided with semispherical inner ends, which ends are adapted to normally seat in the selected arcuate notches 24 formed in the outer edges of the gripping arms 15.

The adjusting nuts 28 are adapted to be threadably engaged upon their associated stems 26 for axial adjustment thereon, said nuts being adapted to normally abut the outer ends of their associated sleeves 27, to thereby maintain and retain the inner ends of said sleeves in their associated selected notches 24, as will be readily apparent by referring to Fig. 2.

It will be obvious from the foregoing and by referring to the drawings that the bifurcated ends of the gripping arms 15 may be adjusted upon the arms 18 of the nut 14 by selecting any of the holes 19 in said arms, also that the angularity of said gripping arms 15 with respect to the axis of the spindle 12 may be regulated by the anti-spreading mechanism 17, to thus accommodate wheels or gears of varying sizes.

In the operation of our wheel puller the same is disposed upon the wheel 10 by abutting the inner end of the spindle 12 against the outer end of the associated rear axle 30 of said wheel, the hub cap of said wheel having been previously removed, the spoke engaging plates are then positioned to contact with two or more of the spokes 31 of said wheel upon the inner sides thereof, as shown. Said plates are then engaged by the claw members 21 of the gripping arms 15 in such a manner that the plates 16 will seat within the recesses 22 of said claw members.

The anti-spreading mechanism 17 is then moved inwardly upon the gripping arms 15 to the desired or selected notches 24 and the inner ends of the sleeves 27 are caused to seat within said notches by adjusting the nuts 28 upon the stem 26, to thereby prevent outward movement of said arms and to positively clamp the wheel puller 11 to the wheel 10.

The wheel 10 is then disengaged or released from its associated rear axle 30 by giving the actuating handle 13 a few turns which causes the nut 14 to move outwardly upon its associated spindle 12, which outward movement of said nut is transmitted to the wheel 10 through the gripping arms 15, thus causing the said wheel to move outwardly upon said rear axle and become disengaged therefrom.

To disengage the wheel puller from the wheel 10, the setting of only one of the gripping arms 15 need be disturbed, thus facilitating and expediting the positioning of the wheel puller 11 upon another wheel of similar size to be removed.

In practice and after exhaustive tests and experimentation we have found that a wheel puller fabricated in accordance with our invention to be very effective and economical in construction and operation.

From the foregoing description taken in connection with the accompanying drawings, the advantages of construction and the method of operation will be readily apparent to those skilled in the art to which our invention relates, to thus enable those so skilled to fabricate and operate the same, but, while we have described the principle of operation of the invention, together with the device which we now consider to be the best embodiment thereof, we desire to have it understood that the wheel puller shown is merely illustrative and that such changes may be made when desired as are within the scope of the invention and embodied in the accompanying claims.

What we claim is:

1. An anti-spreading mechanism for the gripping arms of a wheel puller comprising a spindle an axially movable collar threadably disposed within said spindle, a plurality of radially disposed threaded stems extending outwardly from said collar and adjusting means threadably disposed upon said stems adapted to restrainingly engage said gripping arms against outward movement from a predetermined selected position.

2. An anti-spreading mechanism for the longitudinally gripping arms of a wheel puller which arms are provided with slots and notches, of a wheel puller comprising a spindle, an axially movable collar threadably disposed within said spindle, a plurality of radially disposed threaded stems extending outwardly from said collar and to pass through the slots of said gripping arms, spacing sleeves concentrically disposed for free axial movement upon said stems, said sleeves having semi-spherical inner ends adapted to seat in the selected notches on said gripping arms, and adjusting nuts threadably disposed upon said stems adapted to restrainingly engage said sleeves to thereby retain said gripping arms against outward movement from a predetermined selected position.

In witness whereof, we hereunto subscribe our names this 23rd day of November A. D. 1921.

WALLACE C. ERICKSON.
HORACE L. CONRAD.